(12) United States Patent
Currans et al.

(10) Patent No.: US 7,869,069 B2
(45) Date of Patent: Jan. 11, 2011

(54) PRINTING ON PRE-PRINTED MEDIA

(75) Inventors: Kevin G. Currans, Philomath, OR (US); Richard D. deBronkart, Jr., Salem, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2152 days.

(21) Appl. No.: 10/742,411

(22) Filed: Dec. 19, 2003

(65) Prior Publication Data

US 2005/0134875 A1 Jun. 23, 2005

(51) Int. Cl.
*G06F 15/00* (2006.01)
*G03G 15/00* (2006.01)

(52) U.S. Cl. .......................................... 358/1.15; 399/9

(58) Field of Classification Search ................ 358/1.18, 358/1.16, 1.15, 1.9, 1.1, 504, 520, 3.2, 518, 358/521, 2.1, 408, 523, 3.27, 1.13, 1.14, 358/296, 519; 399/301, 49, 231, 9, 82; 382/167, 382/112; 709/217, 229; 235/6, 26, 8; 400/62, 400/71, 120.16, 188; 715/255, 201, 251, 715/246

See application file for complete search history.

(56) References Cited

U.S. PATENT DOCUMENTS

| 5,202,206 | A | | 4/1993 | Tam | |
|---|---|---|---|---|---|
| 5,715,382 | A | * | 2/1998 | Herregods et al. | 358/1.18 |
| 5,863,372 | A | * | 1/1999 | Fabel | 156/277 |
| 5,909,539 | A | * | 6/1999 | Chikauchi | 358/1.18 |
| 2002/0051174 | A1 | * | 5/2002 | Betts et al. | 358/1.15 |
| 2002/0057449 | A1 | * | 5/2002 | Chapman et al. | 358/1.15 |
| 2004/0201211 | A1 | * | 10/2004 | Weiss | 283/114 |
| 2005/0007413 | A1 | * | 1/2005 | Uchisako et al. | 347/40 |
| 2006/0039733 | A1 | * | 2/2006 | Meyerhofer | 400/62 |

* cited by examiner

*Primary Examiner*—Saeid Ebrahimi Dehkordy

(57) ABSTRACT

Systems, methods, and devices are provided for printing on pre-printed media. A printing device includes a printer component to identify location and color setting information of pre-printed material on a print media. A print engine can execute a print job on the print media based on the location and color setting information of the pre-printed material on the print media.

15 Claims, 5 Drawing Sheets

PRINTING ON PRE-PRINTED MEDIA

In the field of printing, there are print jobs in which some of the information to be printed can be pre-printed on a large quantity of print media, while certain other, e.g., variable information, is to be printed individually on the media. For example, in the printing of business cards for a corporation, the logo, company name, and address are often static in nature. Accordingly, this information may be pre-printed on a large quantity of media. However, an individual's name and telephone number will often be printed in smaller printing runs.

The printers that typically are used to run large quantity or multiple color jobs may take a considerable amount of time to set-up, and sometimes employ several steps to switch from one print job to another. In consideration of efficiency and cost, these printers are generally reserved for large quantity jobs while other printers are used to perform smaller printing runs, e.g., adding individual names to business cards.

One potential benefit of splitting a print job, for example, by printing the variable information later, is that a relatively expensive to operate full color and/or high speed printer can be utilized to print the logo and other information, while a printer that is less expensive to operate and/or designed for lower volume can be utilized to print the variable information at a later time. This allows the full color/high speed printer to be run in longer intervals between set-ups. The printer used for the variable information may have a shorter set-up time or be less expensive to run.

However, pre-printing one portion of the printed image on print media and then printing again over the pre-printed portion may create new issues to consider. For example, when pre-printed information is overlaid by a subsequent print, the pre-printed information may be obscured, or the color of the overlaid portions of the print may be combined to create a color that was not originally intended.

Attempts have been made to ameliorate the above mentioned issues. For example, in some devices the static information may be held in memory until the variable information is provided and then the device is used to print the entire print job at once. In this way, the variable information can be properly placed to account for the positioning of the static information before the print job is begun.

This technique, however, uses a short run on a printer in order to print all of the information. A short run on the printer may reduce efficiency since a set-up and tear-down is involved each time a small quantity of print media is printed.

As another example, in other devices, the static information is applied to the print media in a first pass. Large regions around where the printing resides can then be masked. In this way, the masked static information is protected from being overlaid by the variable information.

However, this format may not accord a level of detail, or alignment precision, to mask an individual "footprint" of an element, e.g., the individual letters, shapes, or words, of the static information. That is, masked regions may be rough areas around the pre-printed information. Additionally, such masks may also not provide any color information pertaining to the pre-printed information.

DETAILED DESCRIPTION

Figure 1:
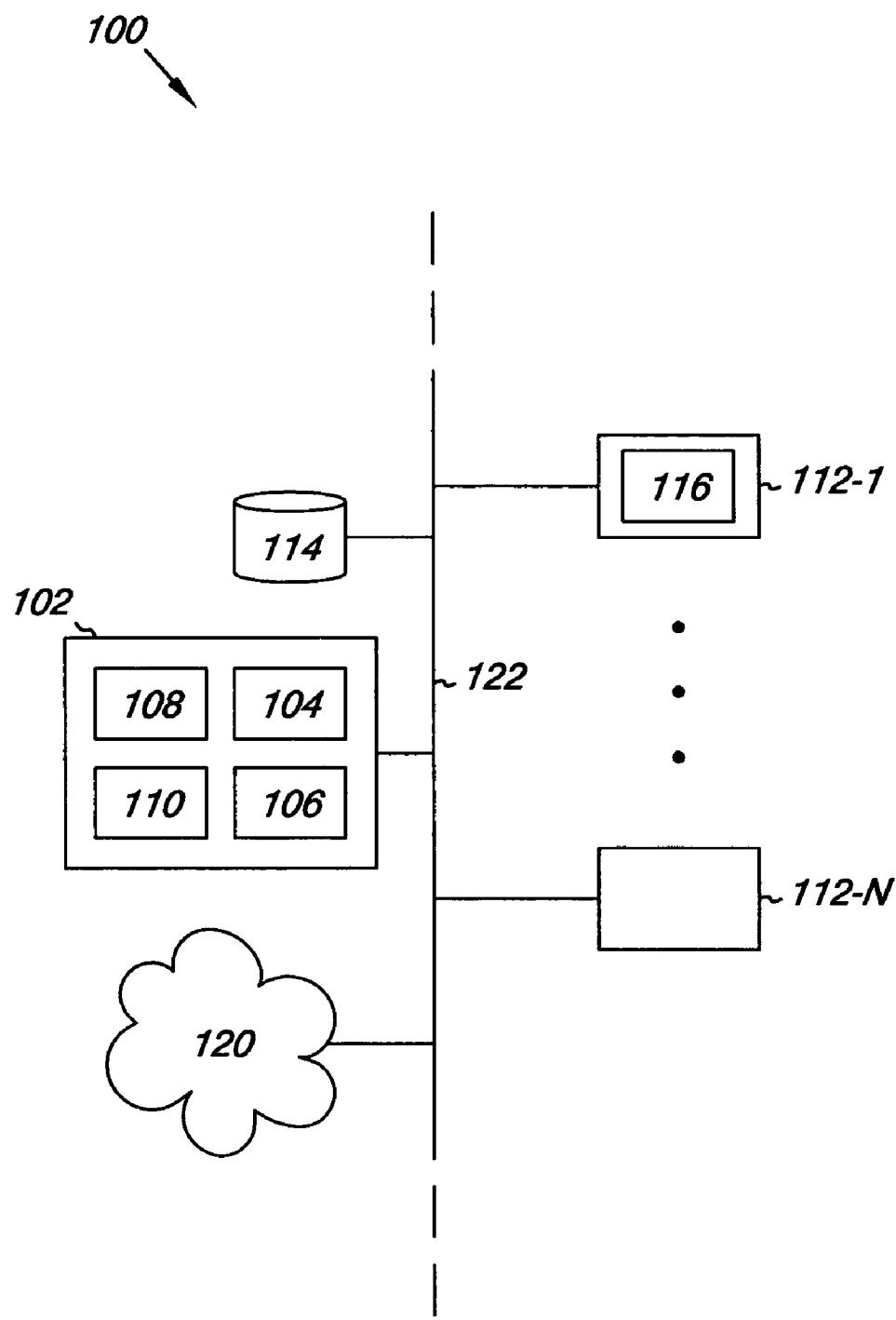
FIG. 1 illustrates an exemplary system environment.

Embodiments of the present invention include systems, methods, and devices for printing on pre-printed media. FIG. 1 illustrates an exemplary system environment 100 including a printing device 102. The printing device 102 can be of any type, including but not limited to, inkjet, electrophotographic (e.g., dry and liquid), offset, and thermal dye sublimation, to name a few. Exemplary embodiment, the printing device can be standalone device. The printing device 102 can also include a high speed device, such as the line of HP-Indigo Press printing devices sold by the Hewlett Packard Company.

As shown in FIG. 1, the printing device 102 can include a processor/controller 104, a memory device 106, a print driver 108, and a print engine 110. Memory, as used in this application, can include any suitable memory for implementing the various embodiments of the invention. Examples of memory types include Non-Volatile (NV) memory (e.g., Flash memory), RAM, ROM, magnetic media, and optically read media and includes such physical formats as memory cards, memory sticks, memory keys, CDs, DVDs, hard disks, and floppy disks, among others.

The processor 104 is operable on computer executable instructions for processing information and data. The processor 104 is operable on computer executable instructions for interpreting received image data including identifying a location of pre-printed areas on print media. As used herein, print media can include draft paper, photo paper, and card stock, among others. Embodiments are not limited to a particular type of print media.

In the exemplary embodiment of FIG. 1, the printing device 102 includes a print driver 108 and a print engine 110. However, additional print drivers 116 can be located off the printing device 102 such as, for example, on a remote device, e.g., remote device 112-1 in FIG. 1. Such additional print drivers can be an alternative to the print driver 108 located on the printing device 102 or can be provided in addition to the print driver 108.

As one of ordinary skill in the art will appreciate, a print driver 108/116 is operable to create a computer readable instruction set for a print job that is utilized for rendering images by the print engine 110. Embodiments are not limited to a particular type of print driver 108/116. The print driver 108/116 can take data from a software application and transform the data into a print job.

As shown in the exemplary embodiment of FIG. 1, the printing device 102 can be connected to a number of remote devices 112-1, . . . , 112-N over a number of data links, shown as 122. The number of data links 122 can include a physical connection, a wireless connection, and/or any combination thereof, as part of a network. Any number and type of remote devices and remote device types 112-1, . . . , 112-N can be connected to the printing device 102. The embodiments of the invention are not so limited.

Remote devices 112-1, . . . , 112-N can also include processors and/or application modules suitable for running software and can include memory devices thereon. Thus, the remote devices 112-1, . . . , 112-N can include desktop computers, laptop computers, workstations, hand held devices, and other peripheral devices, e.g., scanning and/or fax capable devices. Embodiments are not limited to these examples.

As shown in the exemplary embodiment of FIG. 1, the system 100 can include additional storage devices 114, e.g., remote storage database and the like. Further, the system 100 can include Internet connections 120. And, as stated above, data links 122 within such systems can include any combination of direct or indirect wired and/or wireless connections, including but not limited to electrical, optical, and RF connections.

A remote device, 112-1, . . . , 112-N, can be utilized to initiate a print job to be printed on a printing device 102. As mentioned above, the print job consists of a computer readable instruction set that provides instructions on how to print an image. These instructions are communicated in a Page Description Language (PDL) to initiate a print job. PDL's are high level languages for operated on by the print engine 110 of the printing device 102. These instructions include instructions on how to print text and graphics on the print media. For example, the PDL can include a list of printing properties for the print job. Printing properties include, by way of example and not by way of limitation, the elements to be printed (e.g., individual pixels or objects, such as text characters or images), the size of the elements, positioning of each element on the print media, resolution of each element (e.g., Dots Per Square Inch (DPI)), color settings for each element, simplex or duplex setting, indications to process image enhancing algorithms (e.g., halftoning), and the like.

Some document formats include bitmaps of the documents they represent and therefore can be sent directly to a print engine 104 without utilizing a print driver 108/116 to create the print job. These types of files can be saved directly to a memory storage device for printing at a later time. Examples of such file formats include, but are not limited to, portable document format (PDF), joint photographic experts group (JPEG), graphics interchange format (GIF), and the like. Print jobs for other document types can also be provided in these document formats. For example, a print job for a Microsoft Word document can be provided in a PDF format.

A print job document for pre-printed material can be provided in a bitmap format and thus contains information as to the positioning of elements and/or color settings for each element of material that has been printed on the print media. Such pre-printed material can include static (i.e. non-variable) print job information. An example of this is a company logo for a business card. Embodiments of the present invention can use the bitmap print job document to identify the positioning of pre-printed material and color information of pre-printed material on the print media. In this way, the printing of the subsequent information to the same print media can accurately account for the positioning and/or color information of the pre-printed information. Such subsequent printing information can include non-static (i.e. variable) print job information. An example of this is an individual's name and telephone number for a business card. Embodiments, however, are not limited to these examples. Exemplary embodiment, the non-static print job information can be operated on by software, e.g., computer executable instructions, to modify or alter the non-static print job information based on the positioning and/or color information of the pre-printed information.

Embodiments of the invention include various operations for altering or modifying the of the non-static, variable information. By way of example and not by way of limitation, a print location for the variable information can be moved such that the variable information will not overlap the pre-printed information. This can be accomplished, for example, by removing portions of the variable information, e.g., such as portions of a text character, that will overlap the pre-printed material. This can also be accomplished by repositioning a section or all of the variable information so that it does not overlap the pre-printed material. Embodiments are not limited to these examples.

Additionally, the information on the color settings of each element can be utilized to alter or modify the variable information such that when the variable information is printed, the print job will have taken into account the pre-printed color and/or altered the color of the variable information accordingly. To illustrate, by way of example and not by way of limitations, the variable or non-static print job information can be operated on by software, e.g., computer executable instructions, to modify or alter the variable print job information to create a border around the variable information when such information is printed on pre-printed material of the same or similar color, thereby differentiating the variable information from the pre-printed information. Likewise, by way of example and not by way of limitations, the variable or non-static print job information can be operated on by a set of computer executable instructions to modify or alter the color settings in the variable information print job such that variable information printed over pre-printed information can be differentiated from the pre-printed color.

Embodiments of the software described herein can analyze the content of pre-printed material provided in a bitmap format print job to determine whether and which of the above described alterations and/or modifications are to be performed. The embodiments are not limited to the examples given above, and one of ordinary skill in the art will appreciate various relevant actions that may be taken by the software based on an analysis of the content of pre-printed material provided in a bitmap format print job in order to preserve an intended appearance of print material applied over the course of multiple print runs on print media. The software, or executable instructions can modify a print job to locate print information in any number of locations or placement configurations and designs (e.g., adding a border) based on print information from a previous print run. And, the software, or executable instructions can adjust color settings in a print job to account for an effect a particular color setting will have when applied to colors in printed material from a previous print run.

FIGS. 2-5 illustrate various print media which have undergone multiple print runs. Although a single piece of print media is shown in each figure, those skilled in the art understand that print media can be of any quantity, size, shape, and material. For example, print media can be a piece of print material capable of having several and even many images thereon, such as a roll or web of print media.

Figure 2:
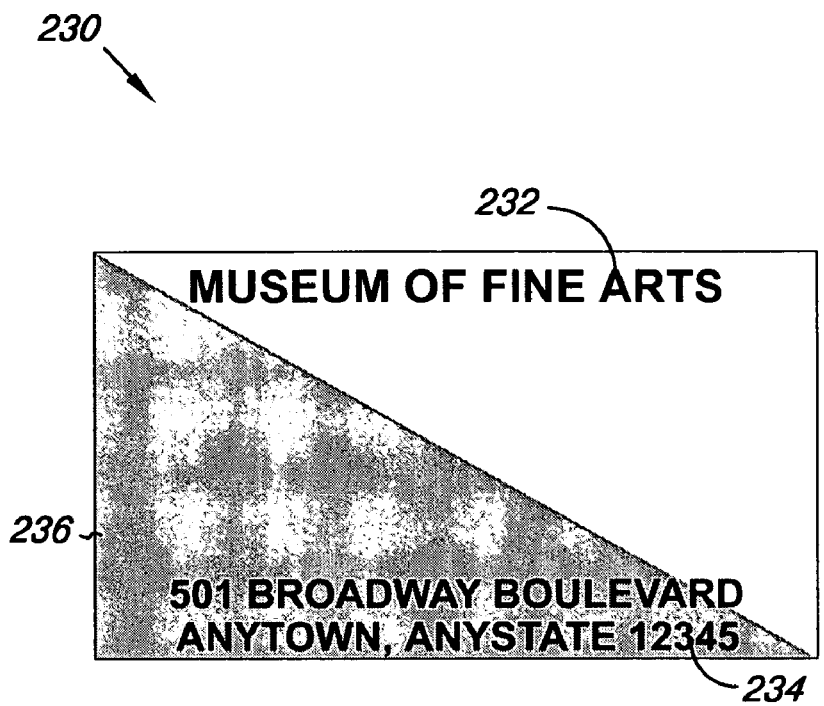
FIG. 2 illustrates an exemplary embodiment of print media with static information printed thereon.

FIG. 2 illustrates an exemplary embodiment of print media with static information printed thereon. FIG. 2 illustrates an exemplary embodiment of print media 230 with static information 232, 234, and 236 printed thereon. In this example, the name of the company 232, e.g., the "Museum of Fine Arts", the address of the business 234, e.g., "501 Broadway Boulevard Anytown, Anystate 12345", and a colored portion 236, are printed on the card in a first pass. Since this information may change with less frequency, a large quantity of pieces can be printed.

Figure 3:
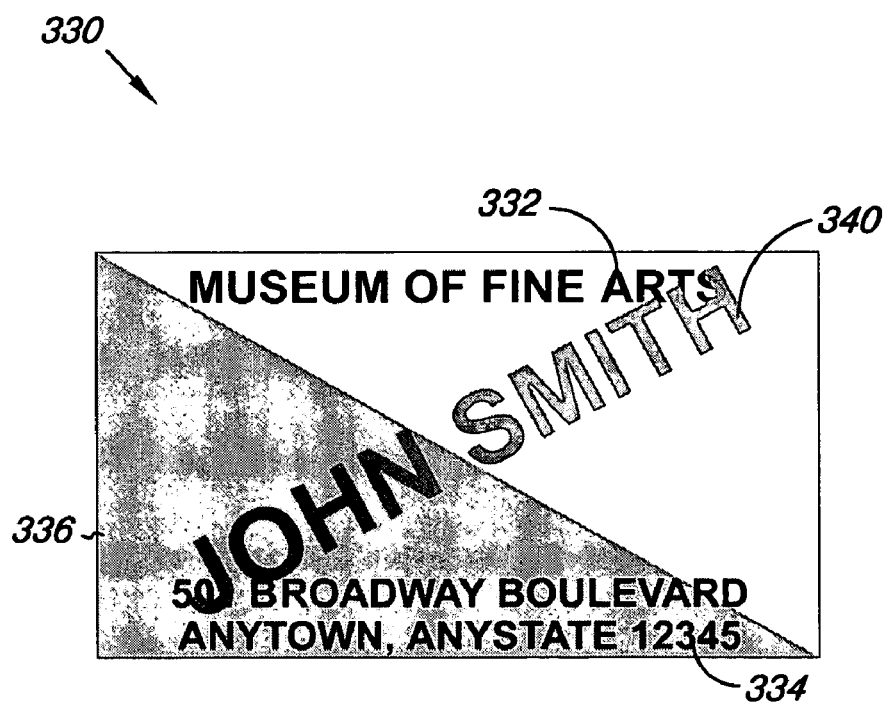
FIG. 3 illustrates how multiple print runs may affect appearance on print media.

FIG. 3 illustrates how multiple print runs may affect appearance on print media. In this exemplary embodiment, print media 330 has a pre-printed name 332, a pre-printed address 334, and a pre-printed colored portion 336 as has been described with respect to FIG. 2. In this example, John Smith has placed an order for his personalized cards. John has ordered his cards with his name 340 overlaid over a portion of both the company name 332 and the address 334. In order to print these, the variable information, e.g., "JOHN SMITH" will be printed on the pre-printed media shown in FIG. 2.

In the example shown in FIG. 3, the print driver creating the print job for the variable information cannot identify the position or the color of the pre-printed information 332, 334, and 336 and, therefore, prints the variable information 340 over the pre-printed information 332, 334, and 336. In this way, the variable information 340 obscures portions of the pre-printed elements, e.g., letters and numbers, 332 and 334 making some elements unreadable. Additionally, the background color 336 changes the color of the overlaid variable information 340, making the overlaid portions darker and/or a different color than the non-overlaid variable information.

Figure 4:
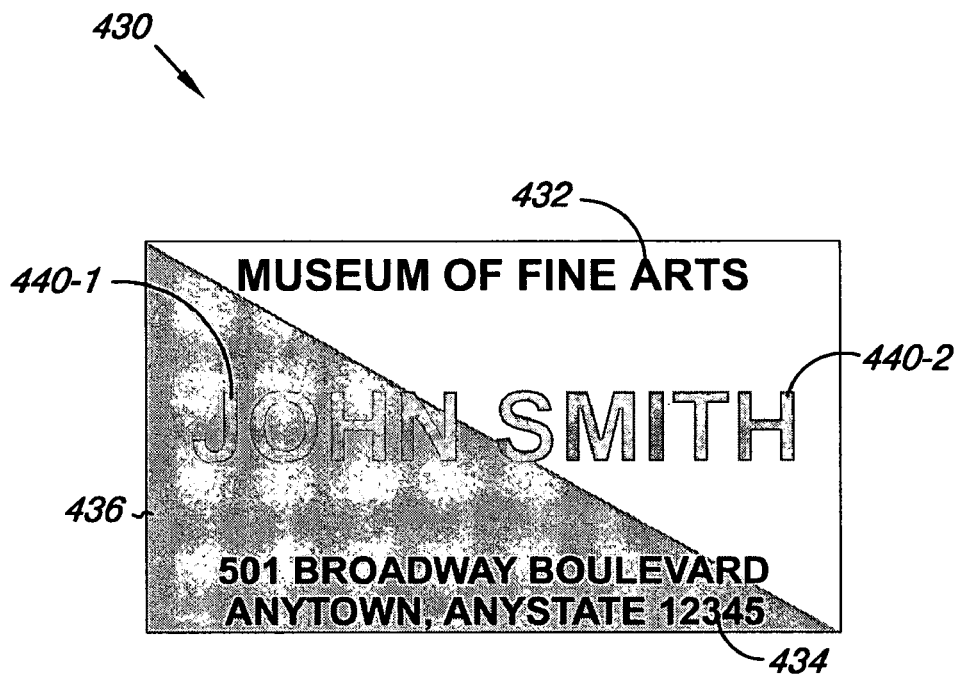
FIG. 4 illustrates multiple print runs on print media according to an exemplary embodiment of the present invention.

FIG. 4 illustrates multiple print runs on a print media according to an exemplary embodiment of the present invention. FIG. 4 illustrates an exemplary embodiment of print media having static and variable information printed thereon. In FIG. 4, a print media 430 has a pre-printed name 432, a pre-printed address 434, and a pre-printed colored portion 436 as has been described with respect to FIG. 2. However, in this exemplary embodiment, the print driver has identified the location and/or the color setting information, e.g., based on information received from a PDF document, of the pre-printed information 432, 434, and 436 and has altered the variable information such that it does not overlap the pre-printed information 432 and 434, but does overlap a section of the pre-printed colored portion 436. The portion of the variable information that overlaps the colored portion 436 is identified by the reference number 440-1, while the portion of the variable information that does not overlap the pre-printed colored portion 436 is identified by reference number 440-2.

Exemplary embodiment such as that shown in FIG. 4, the color and/or brightness of the elements of the variable information can be altered to achieve uniform coloration throughout each element of the variable information and/or to achieve uniform coloration of the variable information as a whole. This can be accomplished by identifying the location of any overlap between any pre-printed element, such as pre-printed colored portion 436, and variable information elements, such as 440-1.

Once an overlap area is identified, executable instructions can adjust the color and/or brightness of the variable information 440-1 and/or 440-2 to achieve a particular color that will provide uniform coloration within each of the elements of the variable information 440-1 and 440-2 as well as throughout all of the variable information. For example, with respect to the exemplary embodiment shown in FIG. 4, if the color and/or brightness of the variable information is not adjusted, the variable information 440-1 that is printed over the pre-printed information 436 can result in variable information 440-1 being darker than variable information 440-2.

As can be seen in FIG. 4, portions of the letter "N" are overlapping on the pre-printed colored portion 436, while other portions of the letter are not overlapping. Thus pieces or sections of an element, such as a letter or number, can be adjusted without adjustment to the rest of the element. For example, a portion of an element of the variable information, such as the overlapping portion of the letter "N" in FIG. 4, can be adjusted to provide color uniformity throughout overlapping and non-overlapping portions of the element. As discussed in more detail below, the color and/or brightness of the overlapping and/or non-overlapping portions of the element can be adjusted to provide a uniform color throughout the element.

As discussed with respect to the elements of the variable information, portions of the variable information can be adjusted in various manners in order to create a uniform color throughout the variable information 440-1 and 440-2. For example, with respect to the exemplary embodiment shown in FIG. 4, the variable information 440-1 can be lightened and/or the color changed to provide a uniform color throughout the variable information 440-1 and 440-2. The variable information 440-2 can also be darkened and/or the color changed to provide a uniform color throughout the variable information 440-1 and 440-2. Further, the variable information 440-1 and 440-2 can both be changed to provide a uniform color throughout the variable information 440-1 and 440-2.

Figure 5:
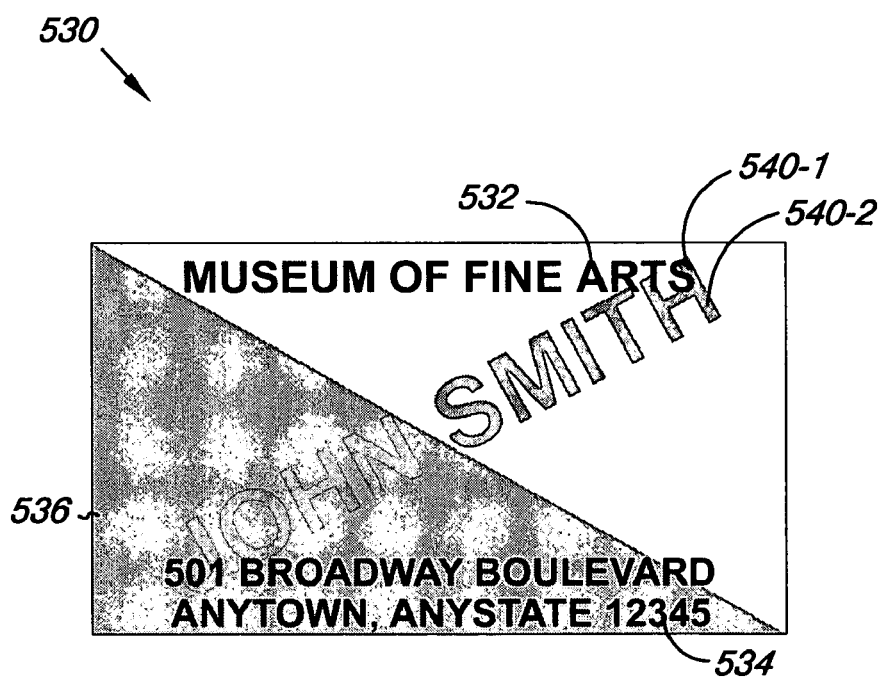
FIG. 5 illustrates multiple print runs on print media according to another exemplary embodiment of the present invention.

Exemplary embodiment, the color does not have to be uniform and can include any particular color configuration suitable to differentiate overlapping information. For example, FIG. 5 illustrates multiple print runs on print media according to another exemplary embodiment of the present invention. FIG. 5 again illustrates an exemplary embodiment of print media having static and variable information printed thereon. In the exemplary embodiment of FIG. 5, print media 530 has a pre-printed name 532, a pre-printed address 534, and a pre-printed colored portion 536 as has been described with respect to FIG. 2. In this exemplary embodiment, a print driver has identified the location and/or the color setting information, as described herein, of the elements of the pre-printed information 532, 534, and 536 and has altered the variable information such that the pre-printed information 532 and 534 and variable information 540-1 are both readable.

In the exemplary embodiment shown in FIG. 5, the color and/or brightness of the elements of the variable information have been altered such that the overlapping variable and pre-printed information are readable. This is accomplished in various manners. For example, by identifying the location of any overlap between a pre-printed element, such as 536, and a variable information element 540-1 and adjusting the color and/or brightness of the overlapping information, or all of the variable information 540-1 and 540-2, to achieve a particular color configuration, e.g., suitable to differentiate the overlapping variable information 540-1 from the overlapped pre-printed information 532 and 534.

Additionally, where the variable information 540-1 overlaps with the pre-printed information 532 and 534, the variable information can be altered to differentiate the variable information 540-1 from the pre-printed information 532 and 534. For example, as shown in FIG. 5, elements of the pre-printed information 532 and 534, e.g., text, number, and/or letter, have been identified by executable instructions and elements of the variable information 540-1 have been modified such that the variable information 540-1 will not be printed over the pre-printed information 532 and 534. In the example shown in FIG. 5, the letters "T" and "H" of the variable information 540-2 can be altered, for example, to avoid printing portions of the "T" and "H" that are to be overlaid on the "R", "T", and "S" of the pre-printed information 532.

Executable instructions can identify the boundary detail, referred to herein as the "footprint", of letters or shapes such that printing over the precise footprint can be avoided, i.e. over the relevant detail of the shape of the pre-printed material without avoiding printing in additional portions not within that particular shape. For example, the letters "J" and "0" of the variable information can be altered to avoid printing portions of the "J" and "0" that are to be overlaid on the "5", "0", "1", and "B" of the pre-printed information 534. As stated above, the alteration of the variable information can be accomplished in any manner. For example, as shown in FIG. 5, the shape of the "J", "O", "T", and "H" elements can be altered to remove sections of the elements that would overlap.

As shown with respect to the exemplary embodiment of FIG. 5, the variable information can also be altered, for example, by darkening the portion of the variable information 540-1 that is to overlap the pre-printed information 532 and/or lightening the variable information 540-2 that will not overlap the pre-printed information 532. In this way, the variable information 540-1 that overlaps the pre-printed information 532 can be adjusted such that either the overlapping or the overlapped information is dominant and therefore stands out over the other overlap information. For example, as shown in FIG. 5, the variable information has the appearance that it is somewhat transparent and, therefore, the readability of the pre-printed information such as "501" and "ARTS" is not substantially affected.

Those skilled in the art will understand that a user of a device or system can modify the print job of a print document manually, for example, through a keyboard on a terminal or computer or other user interface such as a console on a printing device. In this way, a user can make, edit, accept, or reject a modification. A device or system can also modify the print job automatically.

Figure 6:
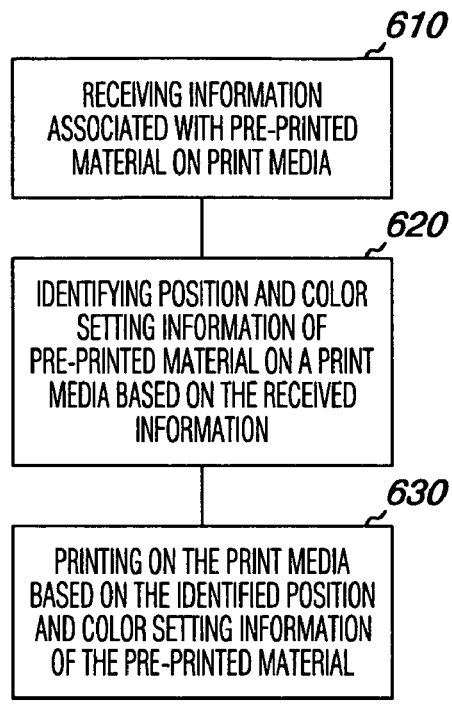
FIG. 6 illustrates an exemplary method embodiment.
Figure 7:
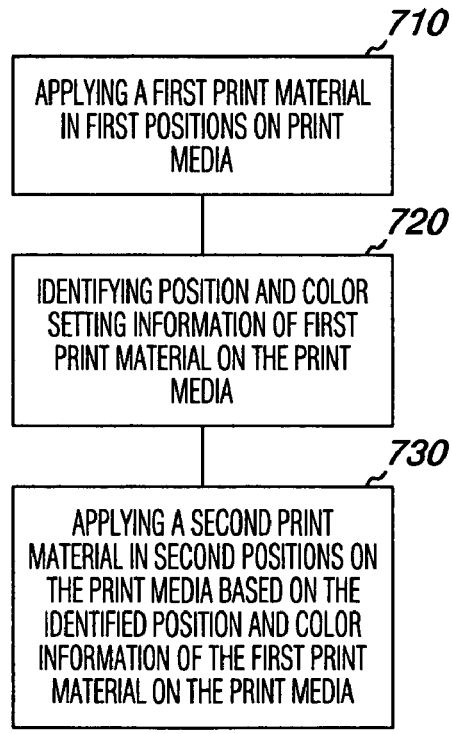
FIG. 7 illustrates another exemplary method embodiment.
Figure 8:
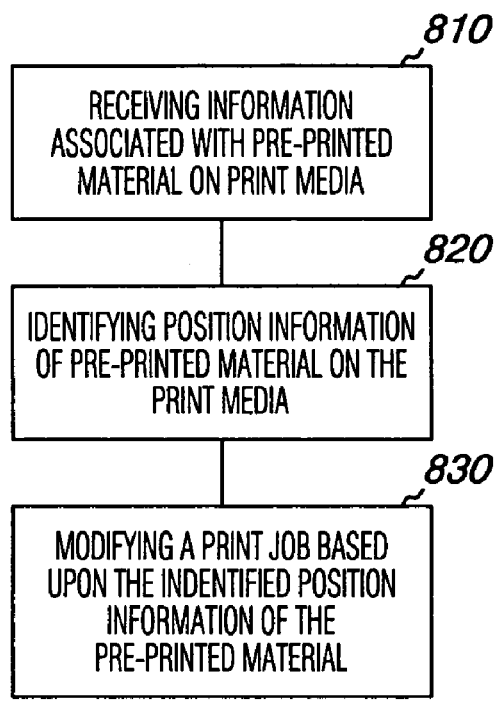
FIG. 8 illustrates another exemplary method embodiment.

FIGS. 6-8 represent various exemplary method embodiments. The methods described herein can be performed by software (e.g., computer executable instructions) operable on the systems and devices shown herein or otherwise. The embodiments of the invention, however, are not limited to any particular operating environment or to software written in a particular programming language. Unless explicitly stated, the methods described below are not constrained to a particular order or sequence. Additionally, some of the methods can be performed at the same point in time. Software, to perform various methods can be located on a computer readable medium. Such a medium can be located on a remote device, e.g., a desktop or laptop, and/or a printing device and/or in a plurality of locations in a distributed network as described in connection with FIG. 1.

FIG. 6 is a block diagram illustrating a method for printing multiple print runs. That is, the exemplary embodiment of FIG. 6 illustrates printing on pre-printed media. As illustrated in the exemplary embodiment of FIG. 6, the method includes receiving information associated with pre-printed material on print media at block 610. Exemplary embodiment, receiving information includes receiving position and/or color setting information from an electronic copy of the print media that includes a bitmap format of a print job representing pre-printed material on the print media. As one of ordinary skill in the art will appreciate, the information can include information relating to the type, dimensions, and/or other relevant information about the print media. The embodiments are not so limited. Receiving position and/or color setting information from an electronic copy of the print media can include receiving the information from a memory. Exemplary embodiment, receiving information includes receiving position and/or color setting information from a PDF document.

The method of FIG. 6 also includes identifying position and/or color setting information of pre-printed material on print media based on the received information at block 620. The method of FIG. 6 also includes printing on the print media based on the identified position and/or color setting of the pre-printed material at block 630.

Exemplary embodiment, the method can include providing a print job for depositing print material on print media already having pre-printed material thereon and modifying the print job to account for identified position and color setting information of the pre-printed material. This includes using software, as described herein, to compare received position and color setting information associated with the pre-printed material, with position and color setting information in the print job, e.g., a subsequently provided print job that has variable information to print.

FIG. 7 is a block diagram illustrating a method for printing. As illustrated in the exemplary embodiment of FIG. 7, the method includes applying a first print material in first positions on print media at block 710. In block 720, the method includes identifying position and color setting information of the first print material on the print media. Identifying the position and color setting information can include identifying position and color setting information of the first print material from information contained in a memory storage device. Information contained in memory includes a bitmap format print job document, i.e. a PDF document, for pre-printed material on the print media. Thus, in this example, identifying the position and/or color setting of the first print material is performed using software, as defined herein, to identify the position and color setting information from the information contained in the PDF document.

In block 730, the method includes applying a second print material in second positions on the print media based on the identified position and color setting information of the first print material on the print media. Applying a second print material can include applying a second print material in second positions that are different from the first positions. And, applying a second print material can include applying a second print material in second positions that are the same as at least one first position. As described herein, applying a second print material in second positions that are the same as at least one first position can include modifying the second print material applied in the second positions that are the same as the first positions.

FIG. 8 is a block diagram illustrating another method for printing. As illustrated in the exemplary embodiment of FIG. 8, the method includes receiving information associated with pre-printed material on print media at block 810. In block 820, the exemplary embodiment includes identifying position information of pre-printed material on print media. Exemplary embodiment, receiving information in block 820 associated with pre-printed material on a print media includes receiving information from a PDF document. And, identifying position information of pre-printed material on the print media includes identifying a footprint of the pre-printed material. That is, the software can identify the boundary detail of letters, numbers, and other shapes such that printing over the a given footprint can be selectively avoided and/or modified.

In this exemplary embodiment, block 830 reflects modifying a print job based upon the identified position information of the pre-printed material. As described above, by way of example and not by way of limitation, a print location for information in the print job can be moved such that the information will not overlap the pre-printed information. Examples include removing portions of the information, e.g., such as portions of a text character, that will overlap the pre-printed material and include repositioning a section or all of the information so that it does not overlap the pre-printed material. Embodiments are not limited to these examples.

As discussed exemplary embodiment, the method can also include adjusting colors in a print job based upon a comparison to pre-printed colors on the pre-printed material. Thus, the method can further include identifying color setting information of pre-printed information on the print media and modifying the print job based upon the identified color setting information of the pre-printed material. In such embodiments, the software can identify information on the color settings of each element, e.g., letter, number and the like, and use this information to modify the information in the print job to account for an effect a particular color setting in the print job will have when applied to colors in printed material from a previous print run. For example, a border can be created and located around the information in the print job so that when such information is printed on pre-printed material of the same or similar color, the subsequent print job information can be differentiated from the pre-printed information. Likewise, by way of example and not by way of limitations, the software can modify the print job information to vary the color settings in the print job information. In this manner, print job information printed over pre-printed information can be differentiated from the pre-printed color. Combinations of such modifications are considered within the scope of the embodiments.

Although specific exemplary embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above exemplary embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b) requiring an Abstract that will allow the reader to quickly ascertain the nature of the technical disclosure. It is submitted with the understanding that it will not be used to limit the scope of the claims.

In the foregoing Detailed Description, various features are grouped together in a single exemplary embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed exemplary embodiment. Thus, the following claims are hereby incorporated into the Detailed Description, with each claim standing on its own as a separate embodiment.

What is claimed:

1. A printing system comprising:
   a processor;
   a memory coupled to the processor;
   means to identify location and color setting information of pre-printed material on a print media;
   means to adjust a print job to be printed on the print media based on the location and color setting information of the pre-printed material; and
   a print engine to execute a print job on the print media.

2. The printing system of claim 1, wherein the means to identify includes executable instructions on the processor to identify location and color setting information of pre-printed information from a PDF document in memory and to compare the identified location and color setting of pre-printed material with print information contained in the print job.

3. The printing system of claim 1, wherein the means to adjust includes executable instructions to modify a portion of the print job based on the location and color setting information.

4. The printing system of claim 3, wherein the means to adjust includes executable instructions to modify colors in the print job based on colors in the pre-printed material.

5. The printing system of claim 1, wherein the memory includes a bitmap format of the pre-printed material.

6. The printing system of claim 5, wherein the bitmap is a JPEG file format.

7. The printing system of claim 1, wherein the system includes an input to allow a user to manually modify a print job based on the identified pre-printed material on the print media.

8. A method for printing comprising;
   applying a first print material in first positions on a print media so that said print media becomes pre-printed print media;
   identifying position and color setting information of the first print material on said pre-printed print media; and
   applying a second print material in second positions on said pre-printed print media based on the identified position and color setting information of the first print material on second positions of said pre-printed print media so that said second print material is modified in at least one of said second positions that overlaps at least one of said first positions.

9. The method of claim 8, wherein identifying position and color setting information includes identifying the position and color setting information of the first print material from information contained in a memory storage device.

10. The method of claim 9, wherein information contained in a memory storage device includes information contained in a GIF file format.

11. A method comprising:
    a print system receiving image data including background image data and first overlay image data;
    said print system adjusting said first overlay image data as a function of said background image data to yield first adjusted image data;
    said print system receiving a first sheet pre-printed with a first background image corresponding to said background image data; and
    said print system printing a first overlay image on said first sheet, said first overlay image corresponding to said first adjusted image data.

12. A method as recited in claim 11 wherein, said print system, while printing said first overlay image, does not print said background image.

13. A method as recited in claim 11 further comprising:
    said print system receiving second overlay image data different from said first overlay image data;
    said print system adjusting said second overlay image data as a function of said background image data to yield second adjusted image data;
    said print system receiving a second sheet pre-printed with a second background image corresponding to said background image data; and
    said print system printing a second overlay image on said on said second sheet, said second overlay image corresponding to said second adjusted image data.

14. A method as recited in claim 11 wherein said printing involves applying at least some overlay print material for forming said first overlay image on at least some pre-printed background print material used to form said first background image.

15. A method as recited in claim 14 wherein said adjusting involves adjusting a portion of said first overlay image data corresponding to a portion of said overlay print material to be applied on said at least some of said pre-printed background print material.

* * * * *

UNITED STATES PATENT AND TRADEMARK OFFICE
CERTIFICATE OF CORRECTION

| | | |
|---|---|---|
| PATENT NO. | : 7,869,069 B2 | Page 1 of 1 |
| APPLICATION NO. | : 10/742411 | |
| DATED | : January 11, 2011 | |
| INVENTOR(S) | : Kevin G. Currans et al. | |

It is certified that error appears in the above-identified patent and that said Letters Patent is hereby corrected as shown below:

In column 10, line 5, in Claim 8, delete "comprising;" and insert -- comprising: --, therefor.

In column 10, line 50, in Claim 13, before "second" delete "on said".

Signed and Sealed this
Twelfth Day of April, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,869,069 B2 | Page 1 of 1 |
| APPLICATION NO. | : 10/742411 | |
| DATED | : January 11, 2011 | |
| INVENTOR(S) | : Kevin G. Currans et al. | |

It is certified that error appears in the above-identified patent and that said Letters Patent is hereby corrected as shown below:

In column 1, line 2, below "PRINTING ON PRE-PRINTED MEDIA" insert -- INTRODUCTION --.

Signed and Sealed this
Tenth Day of May, 2011

David J. Kappos
*Director of the United States Patent and Trademark Office*